United States Patent [19]
Matsumura et al.

[11] Patent Number: 5,148,786
[45] Date of Patent: Sep. 22, 1992

[54] AIR INTAKE SYSTEM ARRANGEMENT OF MOTORCAR ENGINE

[75] Inventors: Yasuo Matsumura; Atsushi Niimi, both of Utsunomiya, Japan

[73] Assignee: Honda Giken Kogyo Kabushiki Kaisha, Tokyo, Japan

[21] Appl. No.: 817,032

[22] Filed: Jan. 3, 1992

[30] Foreign Application Priority Data

Jan. 21, 1991 [JP] Japan .............................. 3-001243[U]
Jan. 21, 1991 [JP] Japan .................................. 3-005078

[51] Int. Cl.⁵ ............................................. F02B 77/00
[52] U.S. Cl. .................................... 123/198 E; 55/276
[58] Field of Search ..... 123/198 E; 55/276, DIG. 21; 181/229; 180/68.3

[56] References Cited

U.S. PATENT DOCUMENTS 5,096,010 3/1992 Ojolo et al. ........................ 180/68.3

FOREIGN PATENT DOCUMENTS 61-147624 9/1986 Japan .

*Primary Examiner*—Noah P. Kamen
*Attorney, Agent, or Firm*—Armstrong, Nikaido, Marmelstein, Kubovcik & Murray

[57] ABSTRACT

An air cleaner is fixed, at least at a fixing portion of the air cleaner, to a motorcar body reinforcing member which is provided in an engine room to increase the supporting rigidity of the air cleaner. The air intake duct is disposed around the reinforcing member so that the duct length can be increased and the duct can be laid out in a space-efficient manner.

20 Claims, 5 Drawing Sheets

AIR INTAKE SYSTEM ARRANGEMENT OF MOTORCAR ENGINE

BACKGROUND OF THE INVENTION

This invention relates to an air intake system arrangement for a motorcar engine and, in particular, to a layout arrangement of an air cleaner and an air duct which is connected to the air cleaner.

In the Japanese Published Unexamined Patent Application No. 147624/1986 there is known an air intake system arrangement in which an air cleaner is mounted on an apron portion which is bent inwards of a wheel housing panel constituting a side wall of an engine room, and in which an air intake duct to be connected to an inlet port of the air cleaner through the apron portion is disposed in a curved manner in a space within a fender which is located outside the wheel housing panel.

In order to restrict the dissipation of the air intake sound from the air intake duct, it is desirable to increase the length of the duct. However, in case where the air intake duct is contained in a limited space within the fender as described above, the duct cannot be made much longer, even if it is bent, out of the limitation on the curvature at the bent. Further, in the above-described arrangement, since the air cleaner is mounted on the apron portion of plate shape, there is a disadvantage in that supporting rigidity of the air cleaner is likely to be lacking.

OBJECT AND SUMMARY OF THE INVENTION

Considering the above-described disadvantages, this invention has an object of providing an air intake system arrangement in which the supporting rigidity of the air cleaner is increased and, further, in which the air duct is increased in its total length and is disposed in a better space efficiency.

In order to achieve the above-described object, this invention is an air intake system arrangement for a motorcar engine characterized in that an air cleaner is fixed at least at a part thereof to a motorcar body reinforcing member which has a closed cross-sectional shape and which is provided in an engine room and that the air duct is disposed around the motorcar body reinforcing member.

In this arrangement, it is possible to increase the supporting rigidity of the air cleaner by utilizing the motorcar body reinforcing member as a member for supporting the air cleaner. In addition, it is possible to increase the length of the air duct by disposing it around the motorcar body reinforcing member. It is further possible to arrange the air cleaner and the air duct in an engine room in a space-efficient manner by utilizing the space around the motorcar body reinforcing member as a space for disposing the air cleaner and the air duct.

In the above-described arrangement, if a fixing portion for fixing the air cleaner to the motorcar reinforcing member is provided in a space enclosed by the air duct which is disposed around the motorcar body reinforcing member, the space efficiency is further increased.

In case where the air cleaner is placed near a side wall of the engine room, it is preferable to utilize the space in front of a damper housing which is provided in the side wall, as a space for placing the air cleaner so that the air cleaner can be supported by the motorcar body reinforcing member such as the side frame that is provided along the side wall. It is also preferable to arrange the air duct around that portion of the motorcar body reinforcing member which is positioned in front of the placing portion of the air cleaner so that the air duct can be disposed in a space-efficient manner.

In case where the air duct is an air intake duct on an upstream side of the air cleaner, the air intake duct is arranged to extend from an inlet port of the air cleaner, respectively, through a laterally (i.e., in the direction of a motorcar's width) outside space of, and further down around a space in the underneath of, and up through a laterally inside space of, the motorcar body reinforcing member. And an upstream end portion is provided to extend from an upper end of the vertically rising portion of the air intake duct towards a laterally outside direction through a space above the motorcar body reinforcing member. According to this arrangement, the duct length can be increased and, at the same time, an air intake port to be formed at an end of the upstream end portion faces a laterally external side, whereby the heated air around the engine is prevented from entering the air intake duct.

BRIEF DESCRIPTION OF THE DRAWINGS

The above and attendant advantages of this invention will become readily apparent by reference to the following detailed description when considered in conjunction with the accompanying drawings wherein.

DETAILED DESCRIPTION OF A PREFERRED EMBODIMENT

Figure 1:
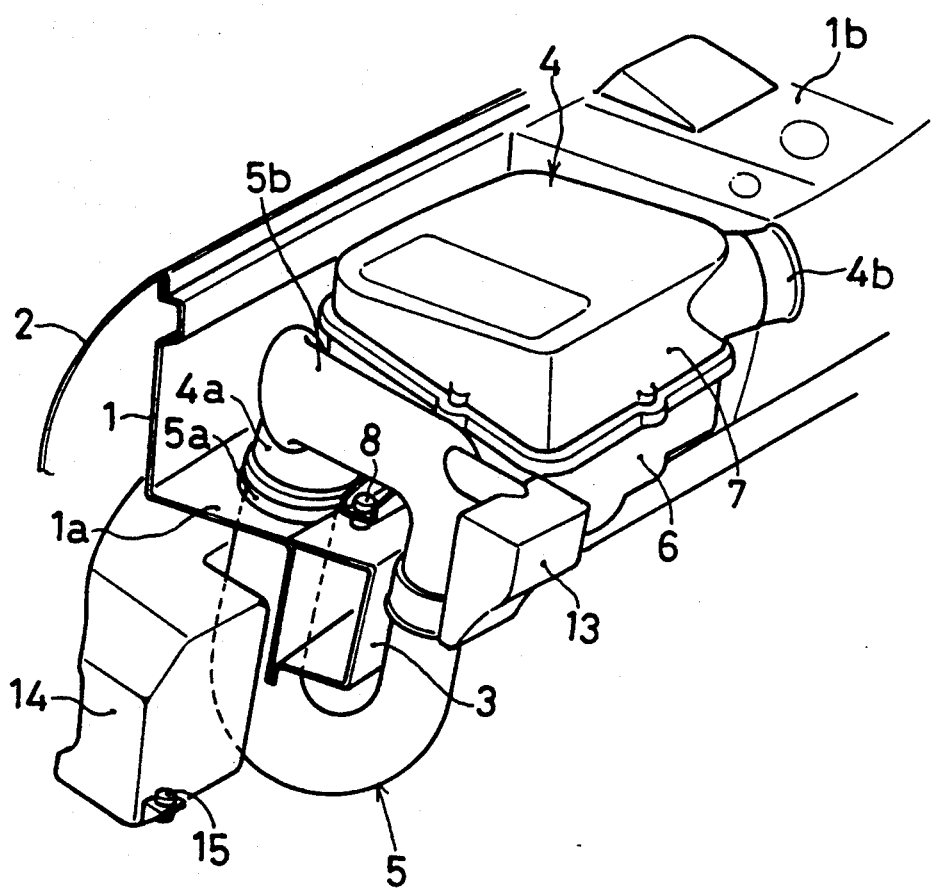
FIG. 1 is a perspective view of an embodiment of this invention.

Referring to FIG. 1, numeral 1 denotes a wheel housing panel which constitutes a side wall of an engine room. Numeral 2 denotes a fender which is provided on an outside of the wheel housing panel 1. An apron portion 1a which is bent inwards is formed of the wheel housing panel 1. That part of the apron portion 1a which extends downwards from the inner end thereof is constituted by a side frame 3 which serves as a motorcar body reinforcing member and which is in a shape of a closed cross section. An air cleaner 4 is disposed in a space in front of a damper housing 1b which is formed in the wheel housing panel 1, such that the air cleaner 4 extends over the apron portion 1a and the side frame 3. In front of the air cleaner 4 an air intake duct 5 which is connected to the air cleaner 4 is disposed so as to enclose the side frame 3.

Figure 2:
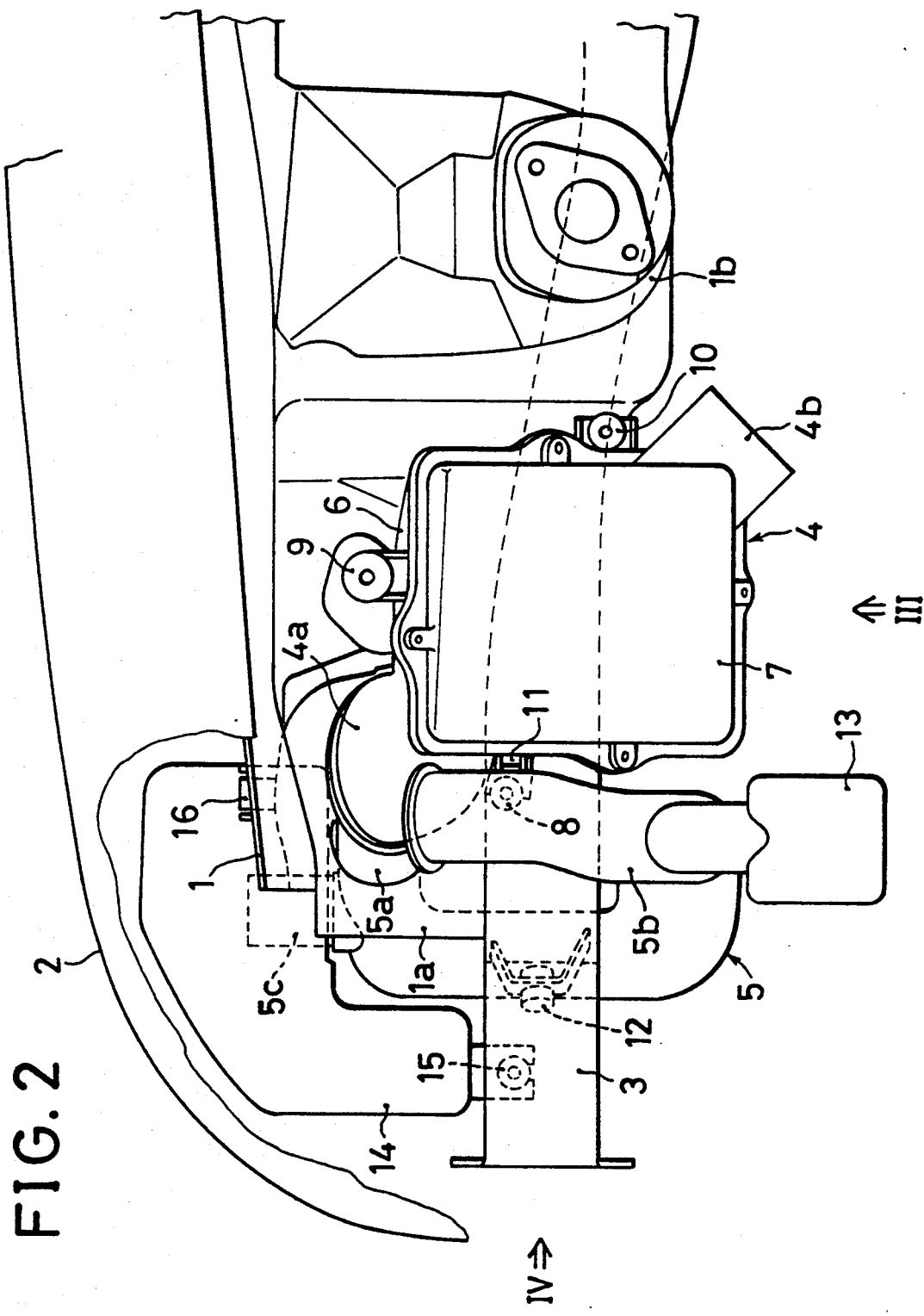
FIG. 2 is a plan view of an important portion thereof.
Figure 3:
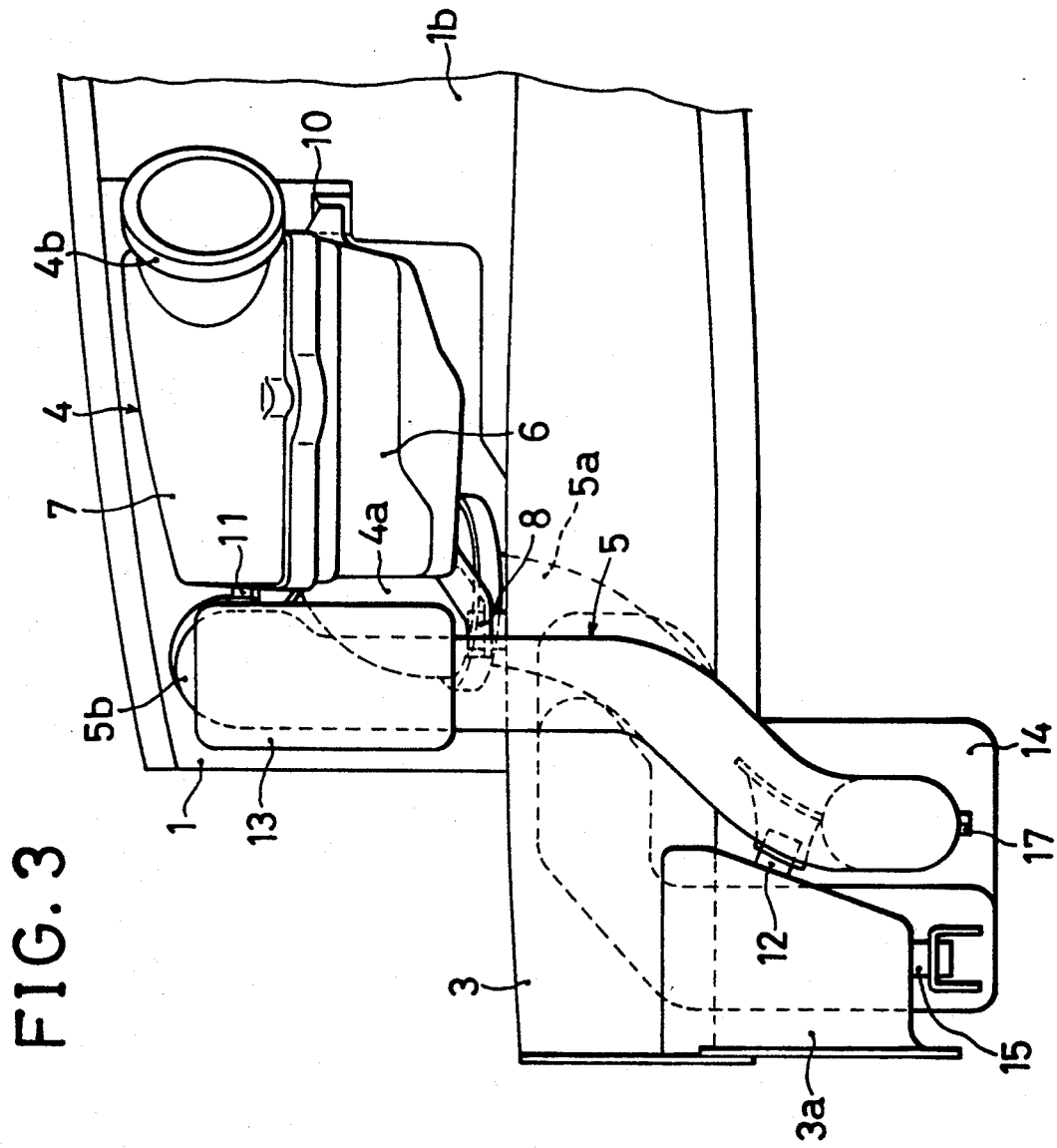
FIG. 3 is a side view of FIG. 2 viewed from the direction of an arrow marked III.
Figure 4:
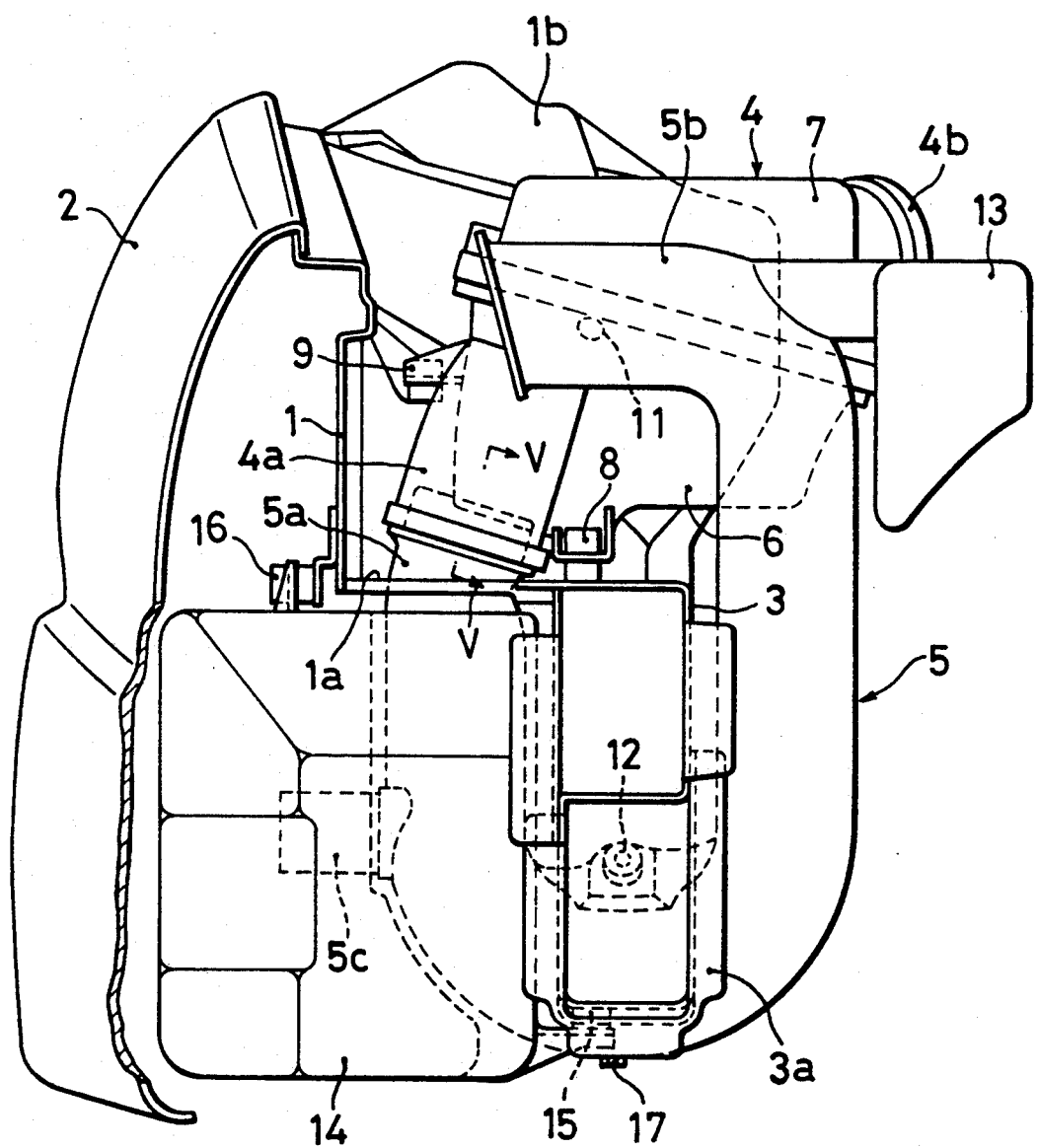
FIG. 4 is a front view of FIG. 2 viewed from the direction of an arrow marked IV.

The air cleaner 4 contains a cleaning element (not illustrated) in a casing which is made up of a lower casing 6 and a detachable upper casing 7. The air to come into the air cleaner 4 from an inlet port 4a formed in the lower casing 6 is cleaned by the cleaning element and is supplied to an engine through an outlet port 4b formed in the upper casing 7. As shown in FIGS. 2 through 4, the air cleaner 4 is fixed to the side frame 3 at a fixing portion 8 in a front lower portion of the lower casing 6. The air cleaner 4 is also fixed to the wheel housing panel 1 and to the damper housing 1b at a fixing portion 9 in an outside upper portion and at a fixing portion 10 in a rear upper portion, respectively, of the lower casing 6.

The air intake duct 5 is arranged such that it extends from the downwardly opened inlet port 4a which is formed in the front portion of the lower casing 6, through the apron portion 1a downwards through a laterally (i.e., in the direction of a motorcar's width) outside space of the side frame 3, and further down around a space under the side frame 3, and up through a laterally inside space of the side frame 3. An upstream end portion 5b is provided to extend from an upper end of the vertically rising portion of the air intake duct 5 towards a laterally outside direction through a space above the side frame 3. Atmospheric air is taken in from an air intake port which opens outwards at the end of the upstream end portion 5b so that heated air around the engine is not sucked into the air intake duct 5. It follows that the air intake duct 5 is arranged to go around nearly the whole circumference of the side frame 3 between a downstream end portion 5a which is connected to the inlet port 4a and the upstream end portion 5b. The air intake duct 5 is fixed, at a fixing portion 11 on the rear of the upstream end portion 5b, to the front side of the lower casing 6 and is also fixed, at a fixing portion 12 located in an intermediate portion of the air intake duct 5 in a space below the side frame 3, to the rear of a pulling bracket 3a which is attached to a front end portion of the side frame 3.

By thus fixing the upstream end portion 5b of the air intake duct 5 to the lower casing 6, vibrations of the upstream end portion 5b can be prevented. This arrangement has also an advantage in that the air intake duct 5 may be left untouched when the cleaner element is exchanged by removing the upper casing 7. This improves the ease of maintenance.

In order to utilize the space defined by the air intake duct 5 which encloses the side frame 3, as a space for mounting the air cleaner 4 to the side fame 3, the above-described fixing portion 8 is located further into a space under the upstream end portion 5b of the air intake duct 5 to fix the air cleaner 4 to the side frame 3 in that position.

In an upstream portion of the air intake duct 5 there is connected a first silencer chamber 13 of relatively small volume. A second silencer chamber 14 of relatively large volume is provided in a space within the fender 2, and the air intake duct 5 is connected to the silencer chamber 14 in an inserting manner at a connecting cylinder 5c which is provided in a downstream portion of the air intake duct 5. In this arrangement, by disposing the air intake duct 5 so as to extend around the side frame 3, the ratio of the space occupied by the air intake duct 5 to the space within the fender 2 can be reduced. As a result, the volume of the second silencer chamber 14 can be increased correspondingly, so that the silencing characteristics for the low-frequency range can be improved. The silencing chamber 14 is fixed to the pulling bracket 3a at a bottom fixing portion 15 and to the wheel housing panel 1 at an upper fixing portion 16, respectively.

In each of the fixing portions 8-11, 15 and 16, there is provided a resilient member to absorb vibrations.

In the bottom of an intermediate portion of the duct 5 which is located in the space under the side frame 3, there is provided a drain hole 17 so that water entering the air intake duct 5 can be drained therethrough.

Figure 5:
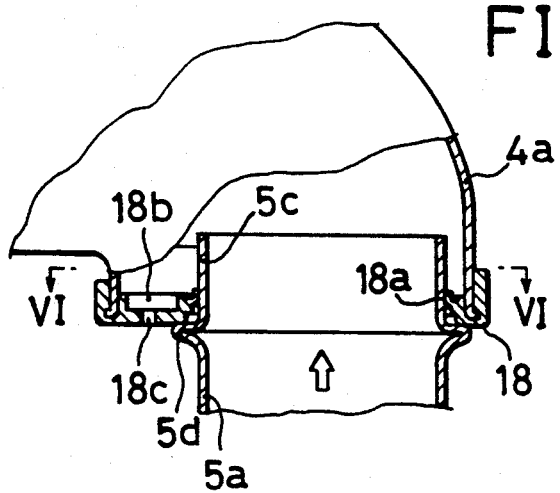
FIG. 5 is a sectional view of a connecting portion between an air cleaner and an air duct taken along the line V—V in FIG. 4.
Figure 6:
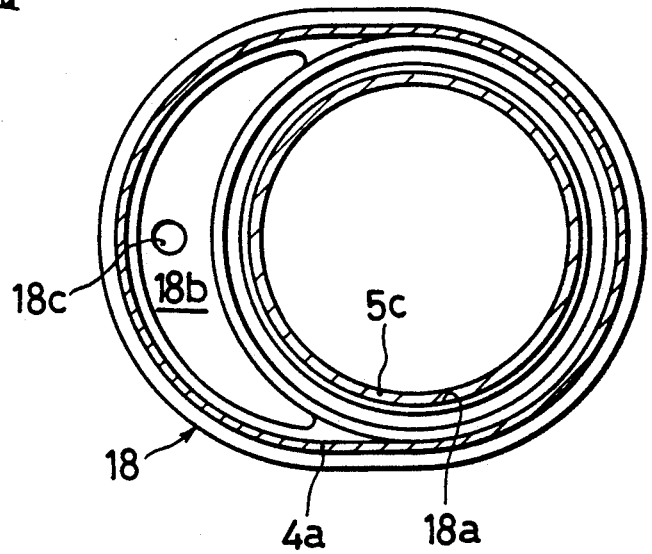
FIG. 6 is a sectional plan view taken along the line VI—VI in FIG. 5.

The inlet port 4a of the air cleaner 4 is formed, as shown in FIGS. 5 and 6, in an oval which is larger than a connecting port 5c at the end of the downstream end portion 5a of the air intake duct 5. An oval rubber sealing member 18 is attached to the inlet port 4a. A fitting opening 18a which diverges to one side of the major axis direction of the oval is formed in the sealing member 18, and the connecting port 5c is fitted into the fitting opening 18a from underneath. According to this arrangement, a dimensional error in the connecting port 5c can be absorbed by the sealing member 18 and, therefore, the duct connecting work can be facilitated. At the downstream end portion 5a of the air intake duct 5 there is formed a flange portion 5d in a position corresponding to the bottom end of the connecting port 5c so that the inserting depth of the connecting port 5c into the sealing member 18 can be restricted by the flange portion 5d.

On the other side of the major axis direction of the oval of the sealing member 18, there are formed a dented portion 18b of crescent shape and a drain hole 18c in the central bottom portion thereof so that water in the air cleaner 4 can be drained through the drain hole 18c. The drain hole 18c is positioned below the open end of the connecting port 5c and, therefore, water does not come into the air intake duct 5 from the open end. When the inlet port 4a and the sealing member 18 are formed in an oval shape and the inserting portion of the connecting port 5c is made to diverge to one side of the major axis direction of the oval as this embodiment, it is advantageous in that a large space can be secured on the other side of the major axis direction of the oval to form therein the drain hole 5c.

Figure 7:
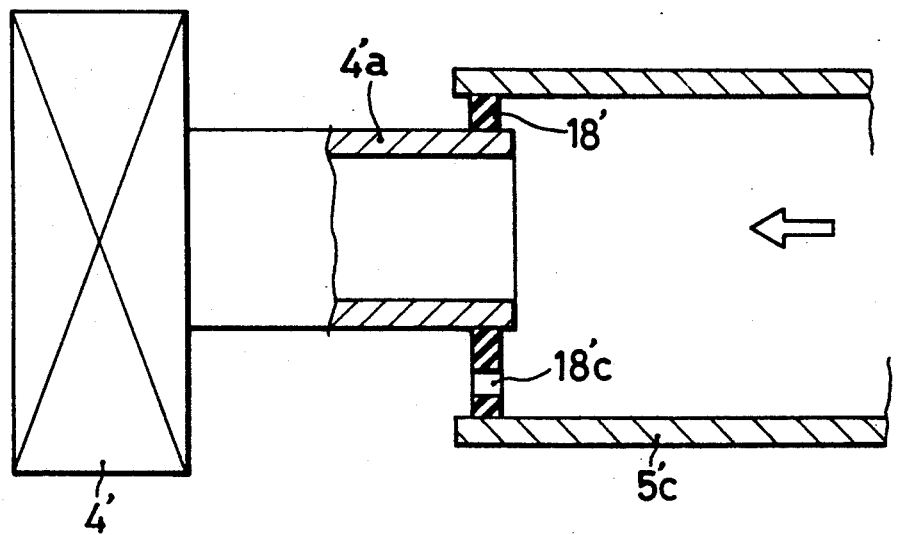
FIG. 7 is a sectional view of another embodiment of a connecting portion between an air cleaner and an air duct.

In case the inlet port 4'a of the air cleaner 4' and the connecting port 5'c of the air intake duct 5' are connected in the horizontal direction, as shown in FIG. 7, the connecting port 5'c can be formed in a relatively large diameter and the sealing member 18' can be mounted thereon so that the inlet port 4'a can be inserted into the sealing member 18'. In this case, a drain hole 18'c is formed in that portion of the sealing member 18' which is below the inlet port 4'a so that the water inside the air intake duct 5' can be discharged through the drain hole 18'c without the water's entering the inlet port 4'a.

In case the inlet port 4'a is inserted into the sealing member 18' like in the embodiment shown in FIG. 7, the air resistance will increase by striking of the air flow against the sealing member 18'. On the contrary, in case where the connecting port 5c is inserted into the sealing member 18 mounted on the inlet port 4a that is formed in a relatively larger diameter, as in the embodiment shown in FIGS. 5 and 6, the above-described disadvantage of the air resistance can be eliminated. It has a further advantage in that, because the duct area on the downstream side is enlarged, the moisture content in the air becomes easily separated through expansion of the air.

In the above-described embodiments, the side frame 3 is selected as the motorcar body reinforcing member to which the air cleaner 4 is fixed and around which the air intake duct 5 is arranged. This invention can also be applied to an embodiment in which the air cleaner is fixed to a motorcar body reinforcing member, other than the side frame 3, inside the engine room.

It is readily apparent that the above-described air intake system arrangement for a motorcar engine has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An air intake system arrangement for a motorcar engine, said air intake system having an air cleaner and an air duct to be connected to said air cleaner, characterized in that: said air cleaner is fixed at least at a part thereof to a motorcar body reinforcing member which has a closed cross-sectional shape and which is provided in an engine room; and that said air duct is disposed around said motorcar body reinforcing member.

2. An air intake system arrangement according to claim 1, wherein a fixing portion for fixing said air cleaner to the motorcar body reinforcing member is provided in a space which is defined by said air duct disposed around said motorcar body reinforcing member.

3. An air intake system arrangement according to claim 1, wherein said air duct is fixed to a motorcar body at a portion where said air duct detours through a space under said motorcar body reinforcing member.

4. An air intake system arrangement according to claim 1, wherein said air duct is provided with a drain hole at a bottom thereof where said air duct detours through a space under said motorcar body reinforcing member 5. An air intake system arrangement according to claim 1, wherein: said air duct is an air intake duct on an upstream side of said air cleaner; said air intake duct is arranged to extend from an inlet port of said air cleaner through a motorcar's widthwise outside space of said motorcar body reinforcing member, further down around a space in an underneath of said motorcar body reinforcing member, and up through a motorcar's widthwise inside space of said motorcar body reinforcing member; an upstream end portion is provided to extend from an upper end of the vertically rising portion of said air intake duct outwards in the motorcar's width direction through a space above said motorcar body reinforcing member; and an air intake port is provided at an end of said upstream end portion.

6. An air intake system arrangement according to claim 5, wherein said upstream end portion of said air intake duct is supported on a lower casing of said air cleaner.

7. An air intake system arrangement according to claim 1, wherein: said air duct is an air intake duct on an upstream side of said air cleaner; one of openings of an inlet port of said air cleaner and a connecting port at a downstream end of said air intake duct is inserted into the other of said openings with a clearance therebetween; a sealing member for closing the clearance is provided; and a drain hole is provided in said sealing member in a position below an open end of said one of openings.

8. An air intake system arrangement according to claim 7, wherein: said inlet port of said air cleaner is arranged to open downwards; said sealing member is attached to said inlet port that represents the other of said openings; and said connecting port at the downstream end of said air intake duct is fitted into a fitting opening which is provided in said sealing member.

9. An air intake system arrangement for a motorcar engine, said air intake system having an air cleaner and an air duct to be connected to said air cleaner, characterized in that: said air cleaner is fixed at least at a part thereof to a side frame which is connected to an apron portion, said apron portion being formed of a wheel housing panel which constitutes an engine room side wall and being bent inward in the motorcar's width direction; and that said air duct is disposed around said side frame.

10. An air intake system arrangement for a motorcar engine according to claim 9, wherein said air cleaner is placed in a space in front of a damper housing which is provided in said wheel housing panel such that said air cleaner extends over said apron portion and said side frame.

11. An air intake system arrangement for a motorcar engine according to claim 10, wherein said air duct is disposed around that portion of said side frame which is positioned in front of a mounting portion of said air cleaner.

12. An air intake system arrangement according to claim 11, wherein that portion of said air duct which detours under said side frame is fixed to a bracket which is attached to a front end portion of said side frame.

13. An air intake system arrangement according to claim 10, wherein a fixing portion for fixing said air cleaner to said side frame is provided in a space which is enclosed by said air duct disposed around said side frame.

14. An air intake system arrangement according to claim 9, wherein a fixing portion for fixing said air cleaner to said side frame is provided in a space which is enclosed by said air duct disposed around said side frame.

15. An air intake system arrangement according to claim 9, wherein: said air duct is an air intake duct on an upstream side of said air cleaner; said air intake duct is arranged to extend from an inlet port of said air cleaner through a motorcar's widthwise outside space of said side frame, further down around a space in an underneath of said side frame, and up through a motorcar's widthwise inside space of said side frame; an upstream end portion is provided to extend from an upper end of the vertically rising portion of said air intake duct outwards in the motorcar's width direction through a space above said side frame; and an air intake port is provided at an end of said upstream end portion.

16. An air intake system arrangement according to claim 15, wherein said upstream end portion is supported on a lower casing of said air cleaner.

17. An air intake system arrangement according to claim 15, wherein: said air duct is in air intake duct on an upstream side of said air cleaner; a first relatively small volume silencer chamber which is in communication with said air intake duct is provided inside an engine room space which is on the inside of a wheel housing panel; and a second relatively large volume silencer which is in communication with said air intake duct is provided inside a fender space which is on the outside of the wheel housing panel.

18. An air intake system arrangement according to claim 9, wherein: said air duct is an air intake duct on an upstream side of said air cleaner; a first relatively small volume silencer chamber which is in communication with said air intake duct is provided inside an engine room space which is on the inside of a wheel housing panel; and a second relatively large volume silencer which is in communication with said air intake duct is provided inside a fender space which is on the outside of the wheel housing panel.

19. An air intake system arrangement for a motorcar engine, said air intake system having an air cleaner and an air duct to be connected to said air cleaner, characterized in that: said air cleaner is placed in a space in front of a damper housing which is provided in a side wall of an engine room; said air cleaner is fixed at least at a part thereof to a motorcar body reinforcing member which is provided along said side wall; and said air duct is disposed around that portion of the motorcar body reinforcing member which is positioned in front of a placing portion of said air cleaner.

20. An air intake system arrangement for a motorcar engine according to claim 19, wherein a fixing portion for fixing said air cleaner to said motorcar body reinforcing member is provided in a space enclosed by said air duct disposed around said motorcar body reinforcing member.

* * * * *